(12) United States Patent
Tomes

(10) Patent No.: US 12,715,576 B2
(45) Date of Patent: Aug. 25, 2026

(54) ROTORCRAFT WITH POWERPLANT EXHAUST SOUND ATTENUATION

(71) Applicant: Pratt & Whitney Canada Corp., Longueuil (CA)

(72) Inventor: Nathan Tomes, Hamilton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/417,039

(22) Filed: Jan. 19, 2024

(65) Prior Publication Data

US 2025/0236386 A1 Jul. 24, 2025

(51) Int. Cl.

| | |
|---|---|
| ***B64C 27/00*** | (2006.01) |
| *B64C 1/40* | (2006.01) |
| *B64C 21/02* | (2006.01) |
| *B64C 21/04* | (2023.01) |
| *B64C 27/82* | (2006.01) |
| *B64D 33/04* | (2006.01) |
| *B64D 33/08* | (2006.01) |

(52) U.S. Cl.

CPC .............. *B64C 27/001* (2013.01); *B64C 1/40* (2013.01); *B64C 21/02* (2013.01); *B64C 21/04* (2013.01); *B64C 2027/8218* (2013.01); *B64C 2027/8245* (2013.01); *B64D 33/06* (2013.01); *B64D 33/08* (2013.01)

(58) Field of Classification Search

CPC .......................... B64C 1/40; B64C 2027/8245

See application file for complete search history.

(56) References Cited

U.S. PATENT DOCUMENTS

| | | | | |
|---|---|---|---|---|
| 2,518,697 A * | 8/1950 | Lee | B64C 27/82 | 60/248 |
| 3,510,087 A * | 5/1970 | Strickland | B64C 27/82 | 244/17.19 |
| 3,807,662 A * | 4/1974 | Velazquez | B64C 27/82 | 244/17.19 |
| 4,137,992 A * | 2/1979 | Herman | F02K 1/827 | 181/269 |
| 4,200,252 A * | 4/1980 | Logan | B64C 27/82 | 244/17.19 |

(Continued)

FOREIGN PATENT DOCUMENTS

| | | |
|---|---|---|
| CN | 2363065 Y | 2/2000 |
| GB | 2238996 B | 5/1993 |
| GB | 2320477 B | 9/1998 |

OTHER PUBLICATIONS

"File: NOTAR System.svg", Wikimedia Commons, https://commons.wikimedia.org/wiki/File:NOTAR_System.svg, Sep. 14, 2007.

*Primary Examiner* — Christopher D Hutchens
(74) *Attorney, Agent, or Firm* — Getz Balich LLC

(57) ABSTRACT

An assembly is provided for a rotorcraft. This rotorcraft assembly includes a fuselage, a tail and a rotorcraft lift system. The tail boom is connected to and projects longitudinally out from the fuselage. The rotorcraft lift system includes a rotorcraft rotor and a powerplant configured to drive rotation of the rotorcraft rotor to generate rotorcraft lift. The powerplant includes a heat engine and a powerplant flowpath. The powerplant flowpath extends through the heat engine. The outlet from the powerplant flowpath is fluidly coupled to an interior volume in the tail boom.

18 Claims, 11 Drawing Sheets

(56) References Cited

U.S. PATENT DOCUMENTS 5,232,183 A * 8/1993 Rumberger ............. B64C 27/82 239/265.29
5,649,678 A * 7/1997 Nurick .................... B64C 27/82 244/17.19
6,352,220 B1 * 3/2002 Banks ..................... B64C 27/82 244/17.11
6,651,929 B2 * 11/2003 Dionne ..................... F02C 7/14 165/44
7,267,297 B2 * 9/2007 Campbell .............. B64D 33/06 60/725
8,250,852 B2 * 8/2012 Porte ....................... F02K 3/115 60/785
8,621,842 B2 * 1/2014 Francisco ............... F01D 25/12 60/770
8,636,242 B2 * 1/2014 Smith ..................... B64C 27/82 244/17.19
8,636,243 B2 * 1/2014 Robertson ............... B64C 27/82 244/17.19
9,284,037 B2 3/2016 Gabrielli
10,118,695 B2 11/2018 Thomassin
10,562,641 B2 * 2/2020 Pantalone, III ......... B64C 27/04
2006/0180388 A1 * 8/2006 Brown .................... F01D 25/30 181/250
2008/0093500 A1 * 4/2008 Smith ..................... B64C 27/82 244/17.19
2008/0185216 A1 8/2008 Baude
2012/0318910 A1 12/2012 Smith
2014/0215999 A1 8/2014 Pantalone, III
2014/0299710 A1 10/2014 Gabrielli
2016/0061056 A1 * 3/2016 Appukuttan ............ F01D 25/10 415/144
2017/0022904 A1 * 1/2017 Nesbitt ................ G10K 11/168
2017/0089238 A1 * 3/2017 Leyko ..................... B23P 19/00
2017/0267341 A1 * 9/2017 Thomassin ............. B64C 27/12
2018/0106225 A1 * 4/2018 Dionne .................. B64D 33/02
2020/0300164 A1 * 9/2020 Muldoon ................ F02C 7/185
2020/0385137 A1 * 12/2020 Dionne .................. B64D 13/08
2020/0385138 A1 12/2020 Dionne
2022/0074329 A1 * 3/2022 Hayes .................. G10K 11/161
2022/0169374 A1 6/2022 Landry

* cited by examiner

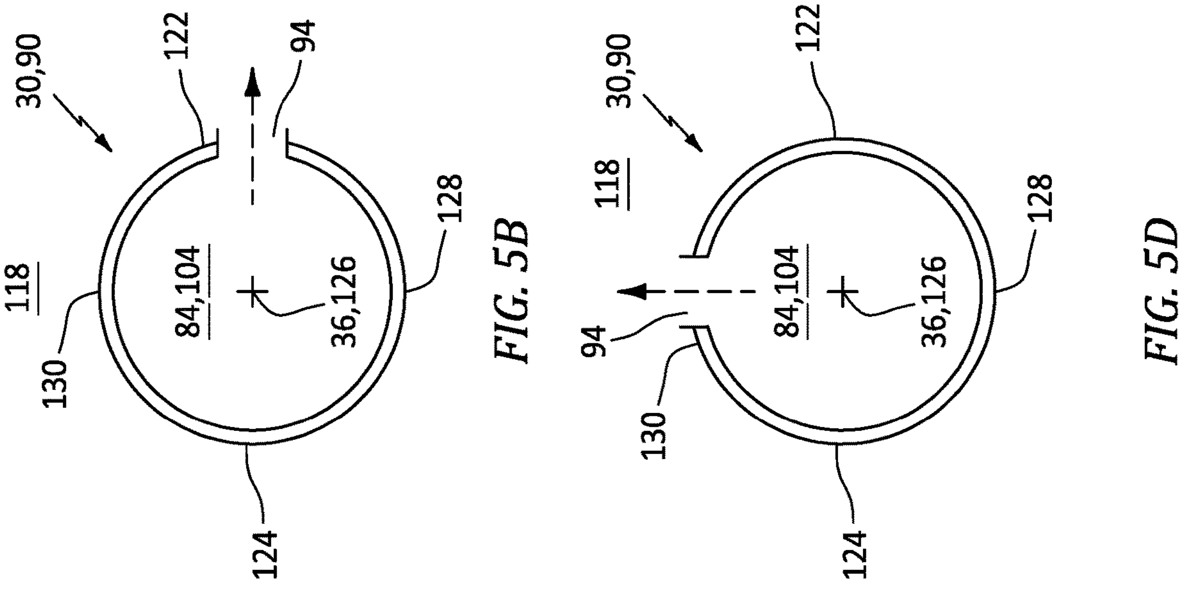
FIG. 5B
FIG. 5D
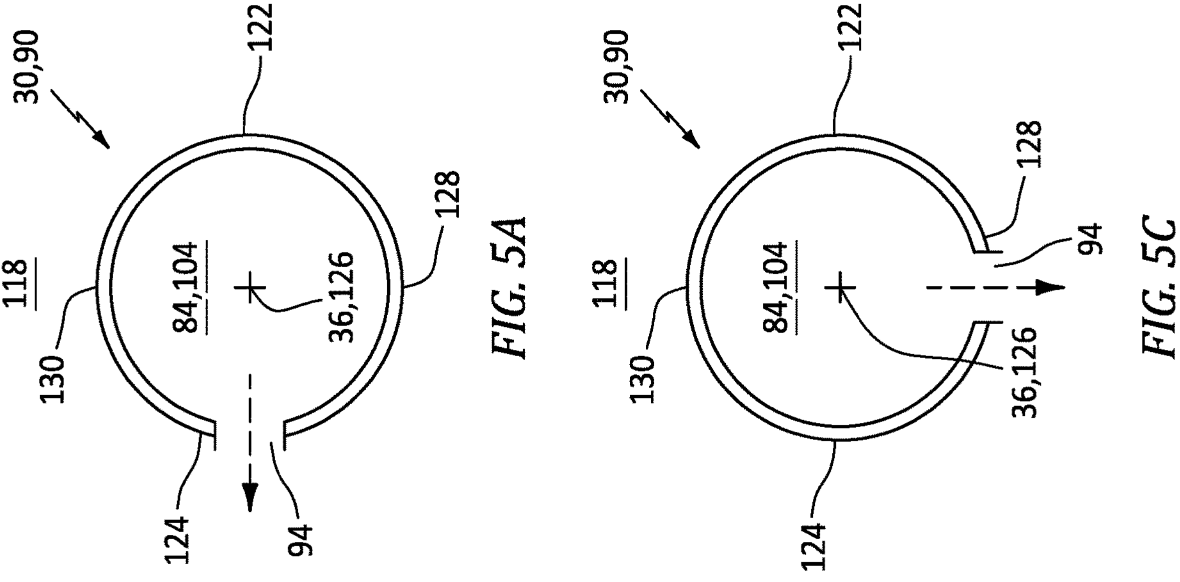
FIG. 5A
FIG. 5C 30
38
94
90
126
124
36

30
38
90
94
126
124
36

30
38
90
94
126
124
36

ROTORCRAFT WITH POWERPLANT EXHAUST SOUND ATTENUATION

TECHNICAL FIELD

This disclosure relates generally to a rotorcraft and, more particularly, to sound attenuation for the rotorcraft.

BACKGROUND INFORMATION

A rotorcraft may be configured with sound attenuation for its powerplant. Various types and configurations of sound attenuation devices are known in the art. While these known sound attenuation devices have various benefits, there is still room in the art for improvement.

SUMMARY

According to an aspect of the present disclosure, an assembly is provided for a rotorcraft. This rotorcraft assembly includes a fuselage, a tail and a rotorcraft lift system. The tail boom is connected to and projects longitudinally out from the fuselage. The rotorcraft lift system includes a rotorcraft rotor and a powerplant configured to drive rotation of the rotorcraft rotor to generate rotorcraft lift. The powerplant includes a heat engine and a powerplant flowpath. The powerplant flowpath extends through the heat engine. The outlet from the powerplant flowpath is fluidly coupled to an interior volume in the tail boom.

According to another aspect of the present disclosure, another assembly is provided for a rotorcraft. This rotorcraft assembly includes a rotorcraft airframe and a heat engine. The rotorcraft airframe includes a fuselage and a tail boom. The tail boom projects longitudinally along a centerline out from the fuselage. The tail boom includes an acoustic panel longitudinally lining at least a portion of an interior volume within the tail boom. The heat engine is disposed in the rotorcraft fuselage. An exhaust outlet from the heat engine is fluidly coupled with an environment external to the rotorcraft airframe through the interior volume within the tail boom. The acoustic panel is configured to attenuate noise propagating in combustion products output from the heat engine through the exhaust outlet.

According to still another aspect of the present disclosure, another assembly is provided for a rotorcraft. This rotorcraft assembly includes a rotorcraft airframe, an air system and a powerplant. The rotorcraft airframe includes a fuselage and a tail boom. The air system includes an air flowpath and an air mover. The air flowpath extends in the rotorcraft airframe. The air mover is disposed within the air flowpath. The powerplant includes a heat engine, a heat exchanger and a powerplant flowpath. The heat exchanger is disposed with the air flowpath upstream of the air mover. The powerplant flowpath extends through the heat exchanger and the heat engine. The powerplant flowpath projects into the air flowpath to an outlet from the powerplant flowpath. The outlet from the powerplant flowpath is disposed with the air flowpath downstream of the air mover.

The rotorcraft assembly may also include a muffler fluidly coupled inline between the exhaust outlet from the heat engine and the interior volume.

The tail boom may include an acoustic panel extending longitudinally along the interior volume downstream of the outlet from the powerplant flowpath.

The acoustic panel may include a first skin, a second skin and a cellular core between and connected to the first skin and the second skin. The cellular core may form a plurality of cavities within the acoustic panel between the first skin and the second skin. Each of the cavities may be fluidly coupled with the interior volume through one or more respective perforations in the first skin.

The first skin may form an outer peripheral boundary of the interior volume.

The second skin may form an exterior surface of the tail boom.

The cellular core may be configured as or otherwise include a honeycomb core.

The interior volume may extend longitudinally along a centerline in the tail boom. The acoustic panel may extend circumferentially about the centerline.

The tail boom may also include a tubular sidewall. The tubular sidewall may form an exterior of the tail boom and an outer peripheral boundary of the interior volume within the tail boom. The acoustic panel may be an integral part of the tubular sidewall.

The rotorcraft assembly may also include a muffler fluidly coupled inline along the powerplant flowpath between the heat engine and the outlet from the powerplant flowpath.

The rotorcraft assembly may also include an air system which includes an air flowpath. An upstream section of the air flowpath may extend within the fuselage. A downstream section of the air flowpath may extend longitudinally within the tail boom. The downstream section of the air flowpath may include the interior volume.

The rotorcraft assembly may also include a mixer arranged at the outlet from the powerplant flowpath.

The air system may be configured as an anti-torque system for the rotorcraft.

The tail boom may include a sidewall and a slot. The sidewall may extend longitudinally along a centerline and circumferentially around the downstream section of the air flowpath. The slot may extend longitudinally in the sidewall. The slot may project through the sidewall to fluidly couple the downstream section of the air flowpath to an environment external to the tail boom.

The tail boom may project longitudinally along a centerline out from the fuselage to a distal tail end of the tail boom. The downstream section of the air flowpath may extend longitudinally within the tail boom to an outlet located at the distal tail end of the tail boom.

The tail boom may include a variable tail thruster arranged at the distal tail end of the tail boom. The variable tail thruster may include the outlet and may be rotatable about an axis.

The powerplant may also include a heat exchanger arranged in the air flowpath upstream of the outlet from the powerplant flowpath. The powerplant flowpath may also extend through the heat exchanger upstream of the heat engine.

The heat engine may be configured as or otherwise include a rotary engine.

The tail boom may be configured without a rotorcraft tail rotor.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5A-D are schematic cross-sectional illustrations of a variable tail thruster in various thrust positions.

DETAILED DESCRIPTION

Figure 1:
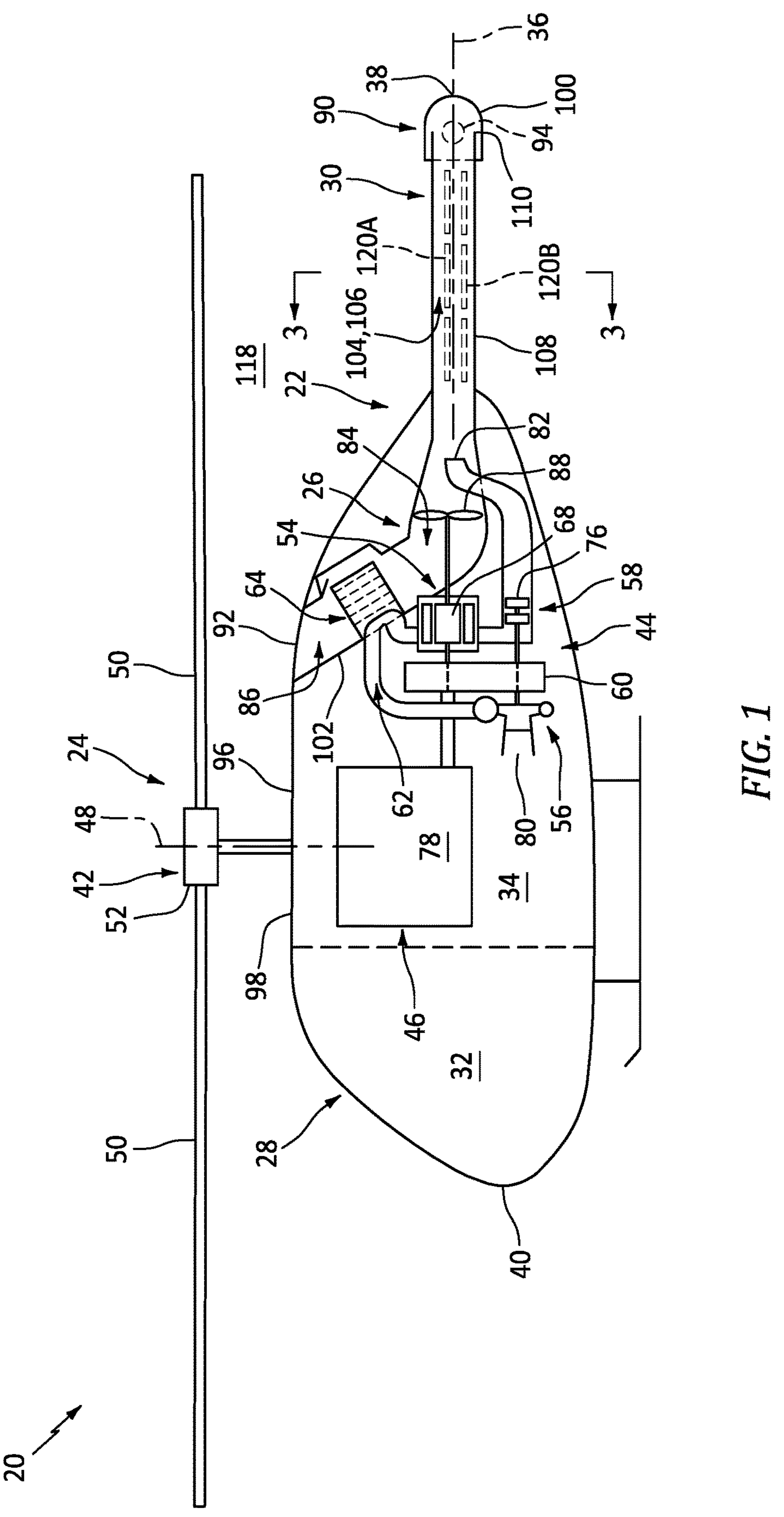
FIG. 1 is a schematic illustration of a rotorcraft.

FIG. 1 illustrates a rotorcraft 20 such as a helicopter or a drone; e.g., an unmanned aerial vehicle. This rotorcraft 20 may be configured as a tail rotor-less rotorcraft; e.g., a rotorcraft configured without an anti-torque tail rotor such as a NOTAR® ("no tail rotor") helicopter. The rotorcraft 20 of FIG. 1, for example, includes a rotorcraft airframe 22, a rotorcraft lift system 24 and a rotorcraft air system 26. As described below in further detail, the air system 26 of FIG. 1 may be configured as a no tail rotor anti-torque system (e.g., a Coanda effect anti-torque system) which replaces a traditional anti-torque tail rotor.

The airframe 22 of FIG. 1 includes a rotorcraft fuselage 28 and a rotorcraft tail boom 30. The fuselage 28 of FIG. 1 includes one or more internal compartments such as a personnel cabin 32 (e.g., a cockpit, a passenger cabin, etc.) and a separate mechanical compartment 34 (e.g., an engine bay, etc.). The tail boom 30 is connected to (e.g., attached to and cantilevered from) the fuselage 28 at an aft end of the fuselage 28. This tail boom 30 projects longitudinally out from the fuselage 28 along a longitudinal centerline 36 of the tail boom 30 to a distal tail end 38 of the tail boom 30. Here, the boom tail end 38 is an aftmost end of the airframe 22 and, more generally, an aftmost end of the rotorcraft 20. A horizontally opposing nose end 40 of the fuselage 28 is a forwardmost end of the airframe 22.

The lift system 24 of FIG. 1 includes a bladed rotorcraft rotor 42 (e.g., an air mover such as a main helicopter rotor), a rotorcraft powerplant 44 and a drivetrain 46. The rotorcraft rotor 42 is rotatable about a rotational axis 48, which rotational axis 48 of FIG. 1 is angularly offset from the centerline 36 by an included offset angle. This offset angle may be between eighty degrees (80°) and one-hundred degrees (100°); e.g., about ninety degrees (90°). The rotorcraft rotor 42 of FIG. 1 includes a plurality of rotor blades 50 and a rotor base 52; e.g., a hub or a disk. The rotor blades 50 are arranged circumferentially about the rotor base 52 and the rotational axis 48 in an array. Each of the rotor blades 50 is connected to and projects radially out from (relative to the rotational axis 48) the rotor base 52. The rotorcraft rotor 42 of FIG. 1 is located vertically above the fuselage 28. Moreover, the rotorcraft rotor 42 is spaced vertically out from the fuselage 28 and, more generally, the airframe 22. Here, the rotorcraft rotor 42 is an unshrouded rotor. The present disclosure, however, is not limited to such an exemplary rotorcraft rotor location or configuration.

Figure 2:
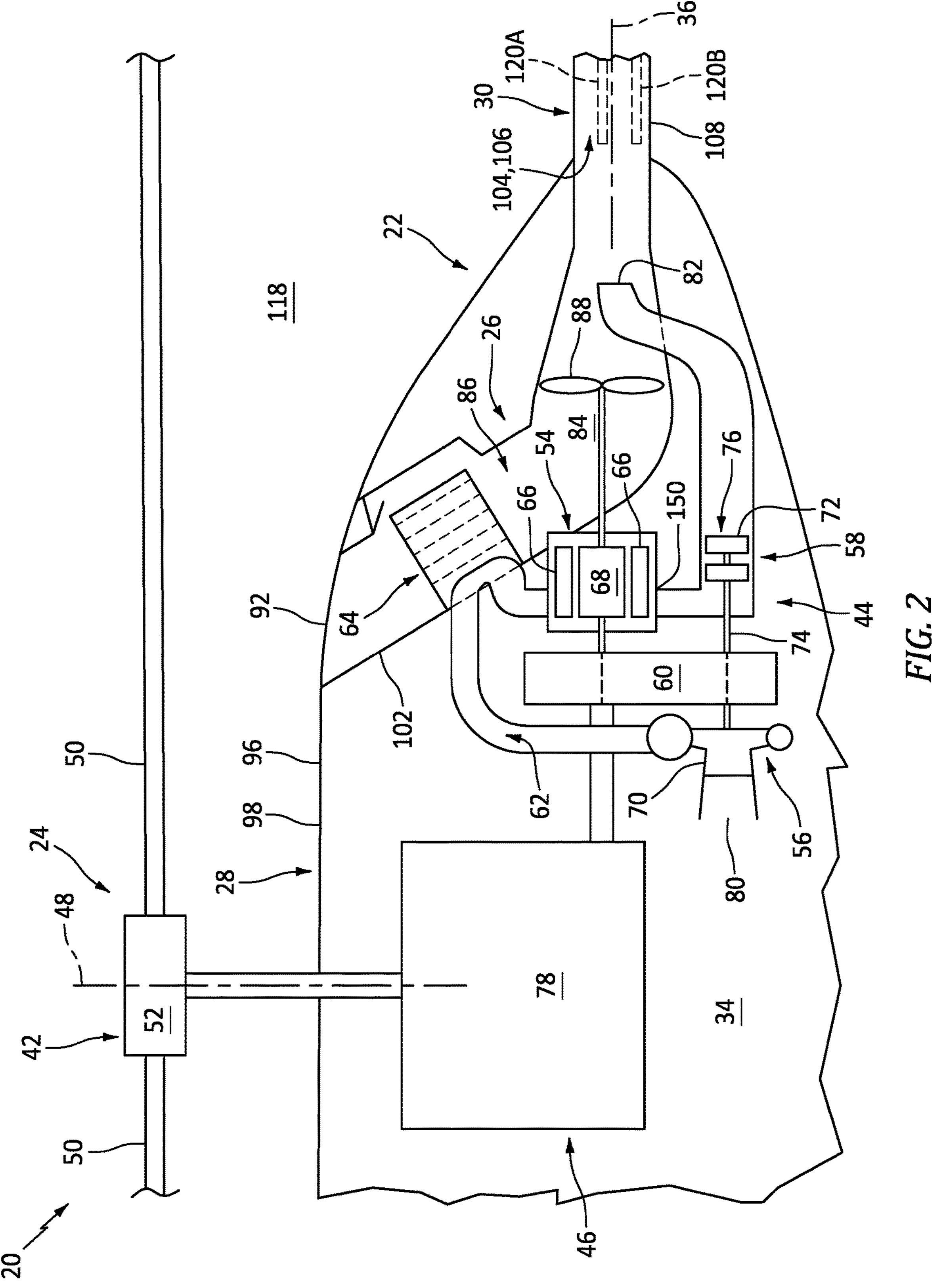
FIG. 2 is a partial schematic illustration of the rotorcraft at its powerplant.

Referring to FIG. 2, the rotorcraft powerplant 44 may be configured as or otherwise include a turbo-compounded engine system. The rotorcraft powerplant 44 of FIG. 2, for example, includes a heat engine 54, a compressor section 56, a turbine section 58 and a transmission 60; e.g., a gear system, a speed change device and/or a variable speed transmission. The rotorcraft powerplant 44 of FIG. 2 also includes a powerplant flowpath 62 (e.g., a core flowpath) and a powerplant heat exchanger 64.

The heat engine 54 of FIG. 2 is an intermittent combustion internal combustion (IC) engine. Examples of this intermittent combustion internal combustion engine include, but not limited to, a rotary engine (e.g., a Wankel cycle engine) and a reciprocating piston engine (e.g., an inline (I) engine, a V-engine or a W-engine). However, for ease of description, the heat engine 54 may be generally described below as the rotary engine. The heat engine 54 of FIG. 2 is configured to detonate (e.g., combust) a mixture of fuel and air within one or more combustion zones 66. Each combustion zone may be configured as or otherwise include a combustion chamber (or a piston bore and/or the like) within the heat engine 54. The detonation of the fuel-air mixture within the combustion zones 66 drives rotation of an internal engine rotating assembly 68 of the heat engine 54. This engine rotating assembly 68 may include one or more rotors (or pistons) in and/or along the combustion zones 66, and is rotatable about an engine axis.

The compressor section 56 includes a bladed compressor rotor 70. This compressor rotor 70 may be configured as a radial flow compressor rotor; e.g., an axial inflow-radial outflow compressor rotor, a centrifugal compressor rotor, a compressor impeller, etc. Alternatively, the compressor rotor 70 may be configured as an axial flow compressor rotor; e.g., an axial inflow-axial outflow compressor rotor. The compressor rotor 70 of FIG. 2 includes a compressor rotor base (e.g., a disk or a hub) and a plurality of compressor rotor blades (e.g., airfoils, vanes, etc.). The compressor rotor blades are arranged circumferentially around the compressor rotor base in an array. Each of the compressor rotor blades is connected to and projects radially out from the compressor rotor base. The compressor rotor 70 is rotatable about a compressor axis.

The turbine section 58 includes a bladed turbine rotor 72. This turbine rotor 72 may be configured as an axial flow turbine rotor; e.g., an axial inflow-axial outflow turbine rotor. Alternatively, the turbine rotor 72 may be configured as a radial flow turbine rotor; e.g., a radial inflow-axial outflow turbine rotor, a centrifugal turbine rotor, a turbine wheel, etc. The turbine rotor 72 of FIG. 2 includes a turbine rotor base (e.g., a disk or a hub) and a plurality of turbine rotor blades (e.g., airfoils, vanes, etc.). The turbine rotor blades are arranged circumferentially around the turbine rotor base in an array. Each of the turbine rotor blades is connected to and projects radially out from the turbine rotor base. The turbine rotor 72 is rotatable about a turbine axis, which turbine axis may be parallel (e.g., coaxial) with the compressor axis.

The turbine rotor 72 may be coupled to the compressor rotor 70 directly through a turbo-compressor shaft 74 or indirectly through the transmission 60. At least (or only) the compressor rotor 70, the turbine rotor 72 and the turbo-compressor shaft 74 may collectively form a turbo-compressor rotating assembly 76; e.g., a spool. This turbo-compressor rotating assembly 76 and its turbine rotor 72 are operatively coupled to and rotatable with the engine rotating assembly 68 through the transmission 60. The turbo-compressor rotating assembly 76 may thereby rotate at a different rotational velocity than the engine rotating assembly 68. The engine rotating assembly 68 is also operatively coupled to and rotatable with the rotorcraft rotor 42 through the drivetrain 46, and the transmission 60 in the exemplary arrangement of FIG. 2. The drivetrain 46 of FIG. 2 includes a geartrain 78 (e.g., a speed change device, a variable speed transmission, etc.) operatively coupling the engine rotating assembly 68/the transmission 60 to the rotorcraft rotor 42. The engine rotating assembly 68 may thereby rotate at a different rotational velocity than the rotorcraft rotor 42.

The powerplant flowpath 62 extends between an airflow inlet 80 into the powerplant flowpath 62 and a combustion products outlet 82 from the powerplant flowpath 62. The flowpath inlet 80 may also be an airflow inlet into the rotorcraft powerplant 44. The flowpath outlet 82 is disposed within an air flowpath 84 of the air system 26. The powerplant flowpath 62 of FIG. 2, for example, projects partially into a central region of the air flowpath 84 to its flowpath outlet 82. Within the rotorcraft powerplant 44, the powerplant flowpath 62 of FIG. 2 extends (e.g., sequentially) through the compressor section 56 (e.g., across the compressor rotor 70), the powerplant heat exchanger 64, the heat engine 54 (e.g., along/across the rotors (or pistons) of the engine rotating assembly 68) and the turbine section 58 (e.g., across the turbine rotor 72) from the flowpath inlet 80 to the flowpath outlet 82.

During operation of the rotorcraft powerplant 44, fuel is injected into the combustion zones 66. The fuel is mixed with compressed air within the combustion zones 66. This fuel-air mixture is ignited, and combustion products generated therefrom drive rotation of the engine rotating assembly 68. The rotation of the engine rotating assembly 68 drives rotation of the rotorcraft rotor 42 through the drivetrain 46, and the rotating rotorcraft rotor 42 generates aircraft lift (and aircraft thrust). The combustion products further flow out of the heat engine 54 into the turbine section 58 and drive rotation of the turbine rotor 72. The rotation of the turbine rotor 72 drives rotation of the compressor rotor 70, and the rotating compressor rotor 70 compresses air entering the rotorcraft powerplant 44 and its powerplant flowpath 62 through the flowpath inlet 80 to provide the compressed air to the heat engine 54. The rotation of the turbine rotor 72 also drives rotation of (e.g., boosts mechanical power to) the engine rotating assembly 68 through the transmission 60. The rotation of the turbine rotor 72 may thereby also drive rotation of (e.g., boost mechanical power to) the rotorcraft rotor 42 through the transmission 60 and the drivetrain 46.

The powerplant heat exchanger 64 may be configured as an intercooler for the rotorcraft powerplant 44. This powerplant heat exchanger 64 is arranged with the air flowpath 84, upstream of the flowpath outlet 82. The powerplant heat exchanger 64 of FIG. 2, for example, is disposed within an upstream section 86 of the air flowpath 84 extending in the fuselage 28. With this arrangement, the powerplant heat exchanger 64 is configured to transfer heat energy from (A) the relatively warm compressed air directed through the powerplant flowpath 62 from the compressor section 56 towards the heat engine 54 into (B) relatively cool air system air ("system air") directed through the air flowpath 84 as described below in further detail. The powerplant heat exchanger 64 may thereby cool the compressed air for delivery to the heat engine 54. This pre-cooling of the compressed air delivered to the heat engine 54 may facilitate increased heat engine efficiency.

As indicated above, the air system 26 of FIG. 1 is configured as a no tail rotor anti-torque system which replaces a traditional anti-torque tail rotor. This air system 26 includes the air flowpath 84 and an air mover 88. The air system 26 of FIG. 1 also includes a variable tail thruster 90, which variable tail thruster 90 is configured as a part of the tail boom 30 at its boom tail end 38.

The air flowpath 84 extends within the airframe 22 between an airflow inlet 92 into the air flowpath 84 and an exhaust outlet 94 (e.g., a nozzle outlet) from the air flowpath 84. The flowpath inlet 92 may be arranged with the fuselage 28. The flowpath inlet 92 of FIG. 1, for example, is formed in an exterior wall 96 of the fuselage 28 at a top side 98 of the fuselage 28 and vertically beneath the rotorcraft rotor 42. Of course, various other flowpath inlet locations are feasible and contemplated by the present disclosure. The exhaust outlet 94 is arranged with the tail boom 30. The exhaust outlet 94 of FIG. 1, for example, is formed in an exterior wall 100 of the variable tail thruster 90 at (e.g., on, adjacent or proximate) the boom tail end 38; see also FIGS. 5A-C.

The upstream section 86 of the air flowpath 84 is formed within the fuselage 28. The upstream section 86 of the air flowpath 84, for example, may be at least partially (or completely) formed by an air duct 102 disposed within the fuselage 28. This air duct 102 may extend from (and form) the flowpath inlet 92 to a downstream section 104 of the air flowpath 84.

The downstream section 104 of the air flowpath 84 may be configured as or otherwise include an interior volume 106 (e.g., a bore, a channel, a passage, etc.) extending longitudinally within the tail boom 30. The downstream section 104 of the air flowpath 84 of FIG. 1, for example, is formed within the tail boom 30. This downstream section 104 of the air flowpath 84 may be at least partially (or completely) formed by an exterior sidewall 108 of the tail boom 30 and the thruster wall 100.

Figure 3:
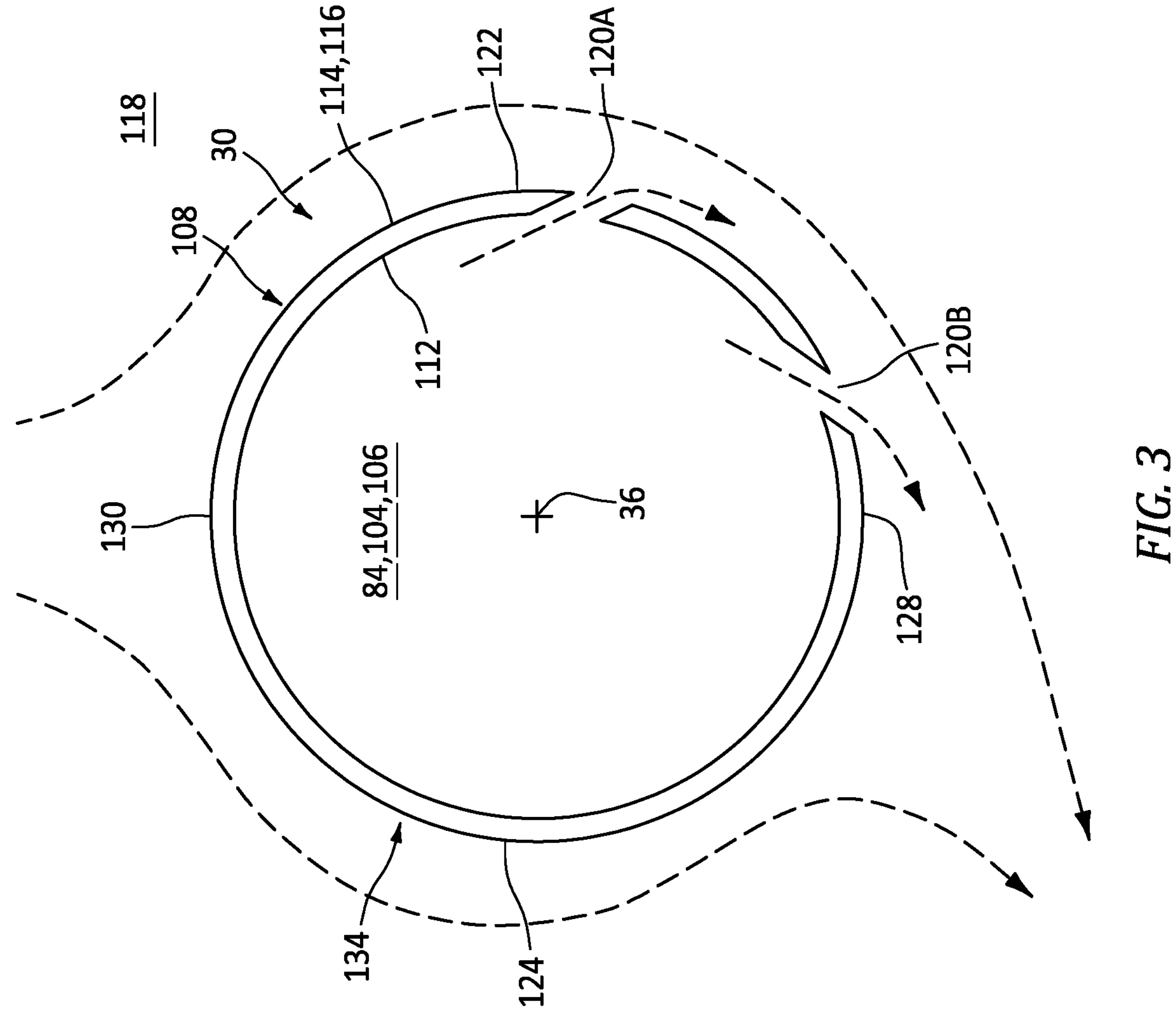
FIG. 3 is a schematic cross-sectional illustration of a tail boom of the rotorcraft taken along section line 3-3 in FIG. 1.

The boom sidewall 108 projects longitudinally along the centerline 36 out from the fuselage 28 to a longitudinal distal end 110 of the boom sidewall 108 proximate the boom tail end 38. Referring to FIG. 3, the boom sidewall 108 extends radially (relative to the centerline 36) between a radial inner side 112 of the boom sidewall 108 and a radial outer side 114 of the boom sidewall 108. The sidewall inner side 112 may at least partially (or completely) form a radial outer peripheral boundary of the air flowpath 84 (e.g., the interior volume 106) within the boom sidewall 108; e.g., from the fuselage 28 to the variable tail thruster 90 of FIG. 1. The sidewall outer side 114 may form an exterior surface 116 of the boom sidewall 108 exposed to an environment 118 external to the tail boom 30 and, more generally, the rotorcraft 20 of FIG. 1. The boom sidewall 108 of FIG. 3 extends circumferentially about (e.g., completely around) the centerline 36 providing the boom sidewall 108 with a full-hoop (e.g., tubular) geometry.

Figure 4:
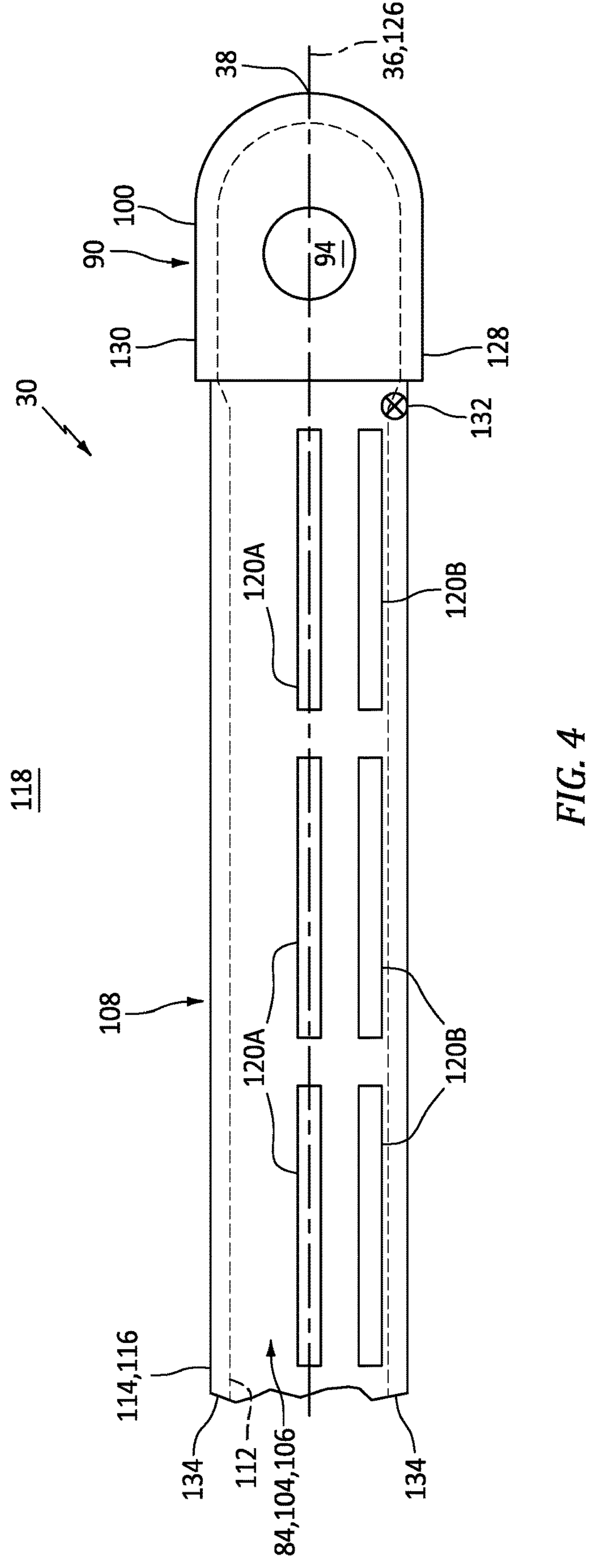
FIG. 4 is a side illustration of the tail boom depicted with various internal features in dashed line form.

Referring to FIG. 4, the boom sidewall 108 also includes one or more slots 120A and 120B (generally referred to as "120"); e.g., intermediate outlets from the air flowpath 84. These slots 120 may be arranged into one or more longitudinally extending arrays, where the top array of slots 120A is located vertically above the bottom array of slots 120B circumferentially along the tail boom 30 and its boom sidewall 108. Referring to FIG. 1, each slot array may extend longitudinally along the tail boom 30 and its boom sidewall 108 from (or about) the fuselage 28 to (or about) a point generally aligned with an outer periphery of the rotorcraft rotor 42.

Each of the slots 120 of FIG. 4 extends longitudinally within the boom sidewall 108 along the centerline 36. Referring to FIG. 3, the slots 120 are disposed to a common (the same) first lateral side 122 of the tail boom 30 and its boom sidewall 108; e.g., a starboard side/right side. Thus, an opposing second lateral side 124 of the tail boom 30 and its boom sidewall 108 (e.g., a port side/left side) may be configured without any slots (or other similar apertures) fluidly coupling the air flowpath 84 to the external environment 118. Each of the slots 120 of FIG. 3 projects through the boom sidewall 108 along a trajectory of the respective slot 120 from the air flowpath 84 (e.g., the interior volume 106) to the external environment 118. This slot trajectory may point generally vertically downward. Each slot trajectory may also be angularly offset from a reference plane tangent to the exterior surface 116 (e.g., at a point where the slot 120 pierces the exterior surface 116) by an included offset angle. This offset angle may be an acute angle between, for example, five degrees (5°) and thirty degrees (30°). With this arrangement, the slots 120 fluidly couple the air flowpath 84 to the external environment 118 and are operable to direct system gas out from the air flowpath 84 into the external environment 118 generally downward and along the exterior surface 116.

Referring to FIG. 4, the variable tail thruster 90 includes the exhaust outlet 94. This exhaust outlet 94 projects (e.g., radially) through the thruster wall 100 from the air flowpath 84 to the external environment 118. The variable tail thruster 90 is rotatably coupled to the boom sidewall 108 at the boom tail end 38. With this arrangement, referring to FIGS. 5A-D, the variable tail thruster 90 may rotate about a thruster axis 126 between various thrust positions. In the thrust position of FIG. 5A, the variable tail thruster 90 positions the exhaust outlet 94 to the second lateral side 124 of the tail boom 30. In the thrust position of FIG. 5B, the variable tail thruster 90 positions the exhaust outlet 94 to the first lateral side 122 of the tail boom 30. In the thrust position of FIG. 5C, the variable tail thruster 90 positions the exhaust outlet 94 to a vertical bottom side 128 of the tail boom 30. In the thrust position of FIG. 5D, the variable tail thruster 90 positions the exhaust outlet 94 to a vertical top side 130 of the tail boom 30.

Referring to FIG. 2, the air mover 88 is disposed within the air flowpath 84. The air mover 88 of FIG. 2 is located within the upstream section 86 of the air flowpath 84 downstream of the powerplant heat exchanger 64. The air mover 88, however, may alternatively be located within the upstream section 86 of the air flowpath 84 upstream of the powerplant heat exchanger 64. The air mover 88 may be configured as a fan rotor. The air mover 88 may be powered by the rotorcraft powerplant 44 and its heat engine 54 or another device (e.g., an electric motor).

During operation of the air system 26 of FIG. 1, ambient air flows into the air flowpath 84 through the flowpath inlet 92. This ambient air may be directed into the air flowpath 84 by thrust (e.g., main rotor wash, downwash) generated by the rotation of the rotorcraft rotor 42 and/or suction generated by rotation of the air mover 88. Within the air flowpath 84, the ambient air-now referred to as the system air—is directed through the powerplant heat exchanger 64 to cool the compressed air in the powerplant flowpath 62 as described above. Downstream of the powerplant heat exchanger 64 (e.g., and the air mover 88), the combustion products are introduced, through the flowpath outlet 82, into the air flowpath 84 for mixing with the system air. The mixture of the combustion products and the system air-now referred to as the system gas—may be directed into the downstream section 104 of the air flowpath 84 and the tail boom 30.

As the system gas flows through the interior volume 106 in the tail boom 30, a portion (e.g., about 30-70%) of the system gas is exhausted from the air flowpath 84 into the external environment 118 through the slots 120. Referring to FIG. 3, this exhausted system gas may interact with rotor wash from the rotorcraft rotor 42 to turn the rotor wash flowing around the tail boom 30 to the second lateral side 124 of the tail boom 30; e.g., where the rotorcraft rotor 42 is rotating counterclockwise when looking vertically down onto a vertical top of the rotorcraft 20 (see FIG. 1). By turning/redirecting the rotor wash towards the second lateral side 124 of the tail boom 30, the air system 26 is operable to utilize this redirected rotor wash to provide lateral thrust to counteract rotational torque imparted onto the airframe 22 by the rotation of the rotorcraft rotor 42. The air system 26 is thereby configured as an anti-rotation system for the rotorcraft 20 (see FIG. 1).

Referring to FIG. 4, another portion (e.g., about 30-70%) of the system gas is exhausted from the air flowpath 84 into the external environment 118 by the variable tail thruster 90 and through its exhaust outlet 94. Referring to FIGS. 5A and 5B, the variable tail thruster 90 may be rotated about the thruster axis 126 between its various thrust positions in order to control yaw of the rotorcraft 20 (see FIG. 1). For example, to facilitate rotorcraft port-side yaw, the variable tail thruster 90 may be rotated to its thrust position of FIG. 5A. To facilitate rotorcraft starboard-side yaw, the variable tail thruster 90 may be rotated to its thrust position of FIG. 5B. Referring to FIGS. 5C and 5D, the variable tail thruster 90 may be rotated about the thruster axis 126 between its various thrust positions in order to control pitch of the rotorcraft 20 (see FIG. 1). For example, to facilitate rotorcraft vertical downward pitch, the variable tail thruster 90 may be rotated to its thrust position of FIG. 5C. To facilitate rotorcraft vertical upward pitch, the variable tail thruster 90 may be rotated to its thrust position of FIG. 5D.

In some embodiments, referring to FIG. 4, the air system 26 may also include a flow regulator 132 (e.g., a valve, a vent, etc.) along the air flowpath 84. The flow regulator 132 of FIG. 4 is disposed longitudinally along the tail boom 30, for example downstream/aft of the slots 120 and upstream/forward of the exhaust outlet 94. This flow regulator 132 is configured to selectively exhaust (e.g., diffuse) the system gas into the external environment 118. By selectively exhausting the system gas, the flow regulator 132 is operable to tune operation of the variable tail thruster 90. For example, by opening or exhausting additional system gas through the flow regulator 132, less of the system gas is available to flow through the exhaust outlet 94 to generate thrust. However, by closing or exhausting less system gas through the flow regulator 132, more of the system gas is available to flow through the exhaust outlet 94 to generate thrust.

Figure 6:
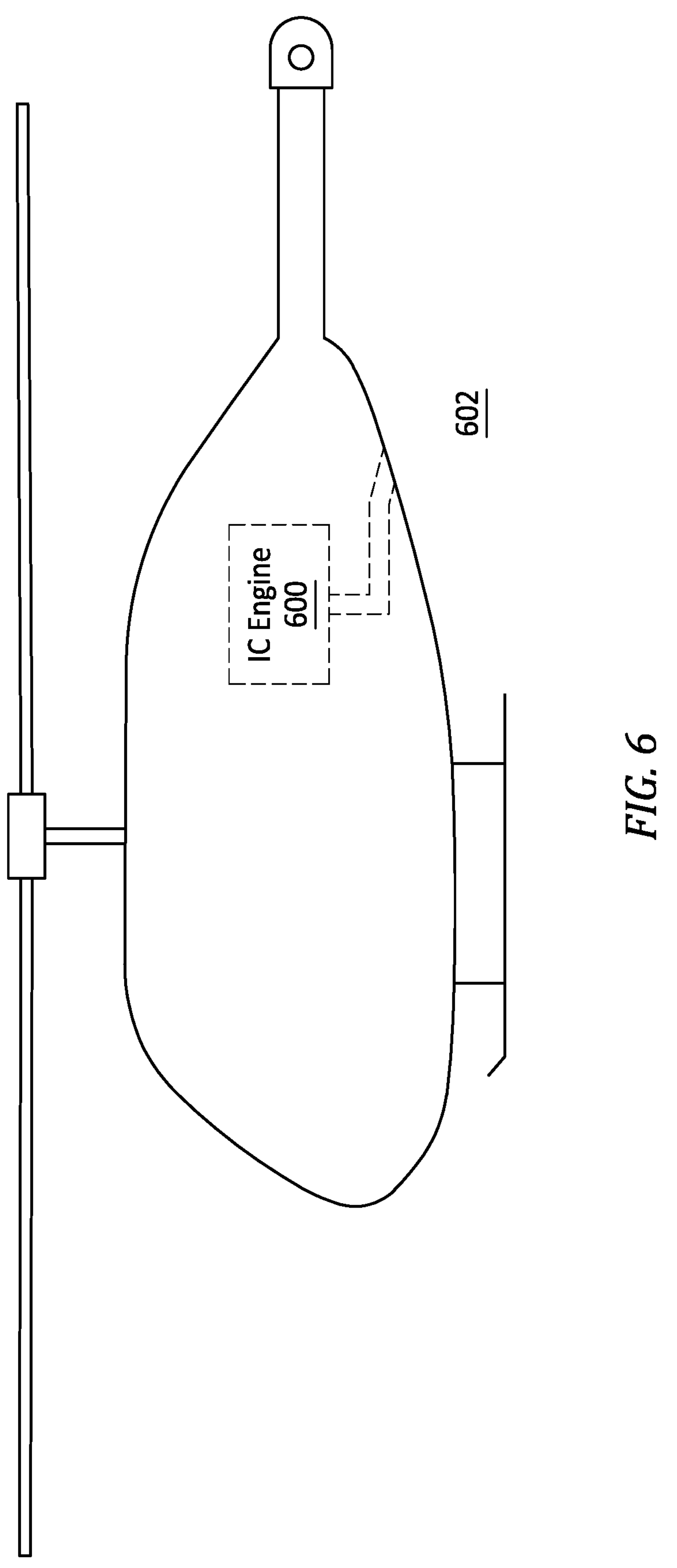
FIG. 6 is a schematic illustration of another rotorcraft.

FIG. 6 illustrates an internal combustion engine 600 which exhausts its combustion products directly into an external environment 602 via a straight pipe arrangement; e.g., an exhaust without sound attenuation. With this arrangement, noise (e.g., undesirable sound) generated by operation of the internal combustion engine 600 may propagate in the combustion products and pass directly into the external environment 602 with little or no sound suppression. By contrast, noise generated by operation of the rotorcraft powerplant 44 of FIG. 1 and its heat engine 54 is directed with the combustion products into the air flowpath 84 prior to being exhausted into the external environment 118 through one or more outlets from the air flowpath 84; e.g., the slots 120 and/or the exhaust outlet 94. With this arrangement, the noise propagating in the combustion products and then the system gas (following the mixing of the combustion products with the system air in the air flowpath 84) may be attenuated (e.g., reduced or eliminated) utilizing one or more sound attenuation devices. Examples of these sound attenuation devices include an acoustic panel 134 (e.g., see FIGS. 7 and 8) and/or an acoustic muffler 136 (e.g., see FIGS. 9A and 9B).

Figure 7:
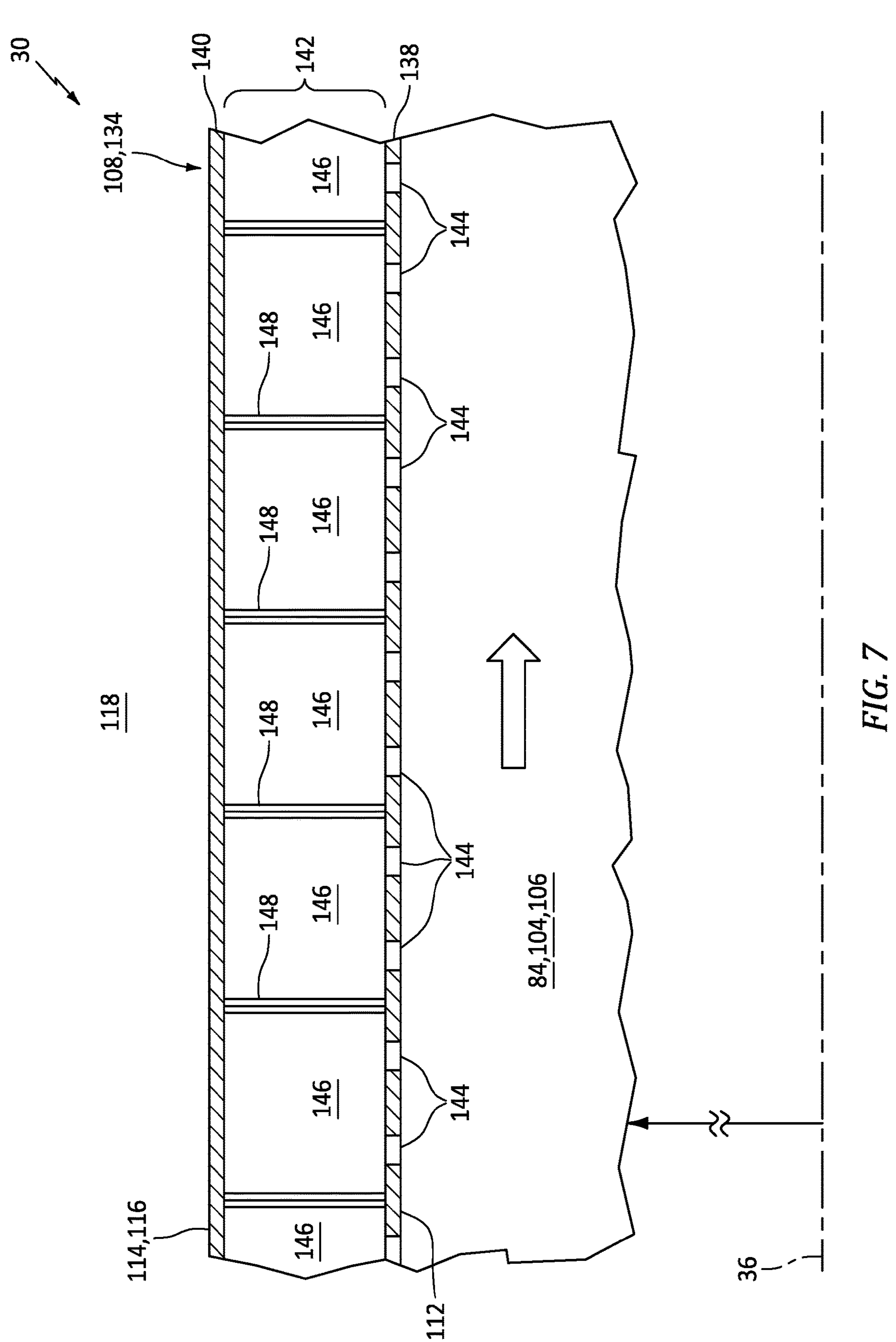
FIG. 7 is a partial side sectional illustration of the tail boom with an acoustic panel.

Referring to FIG. 4, the acoustic panel 134 extends longitudinally along the air flowpath 84 and the centerline 36. The acoustic panel 134 of FIG. 4, for example, extends partially (or completely) along a portion of the air flowpath 84 (e.g., the interior volume 106) bordered by the boom sidewall 108 within the tail boom 30. Referring to FIG. 3, the acoustic panel 134 is disposed radially outboard of the air flowpath 84. The acoustic panel 134 extends circumferentially about (e.g., substantially or completely around) the air flowpath 84 and the centerline 36. The acoustic panel 134 may thereby at least partially (or completely) form the outer peripheral boundary of the air flowpath 84 (e.g., the interior volume 106) within the tail boom 30 and its boom sidewall 108. Referring to FIG. 7, the acoustic panel 134 includes a perforated interior skin 138, a non-perforated exterior skin 140 and a cellular core 142.

The interior skin 138 of FIG. 7 is disposed radially inboard of the core 142. This interior skin 138 at least partially (or completely) forms the outer peripheral boundary of the air flowpath 84 (e.g., the interior volume 106) within the tail boom 30 and its boom sidewall 108. The interior skin 138 includes a plurality of perforations 144; e.g., through-holes or other apertures. Each of these perforations 144 projects radially (relative to the centerline 36) through the interior skin 138.

The exterior skin 140 of FIG. 7 is disposed radially outboard of the core 142. This exterior skin 140 at least partially (or completely) forms the exterior surface 116 of the tail boom 30 and its boom sidewall 108.

Figure 8:
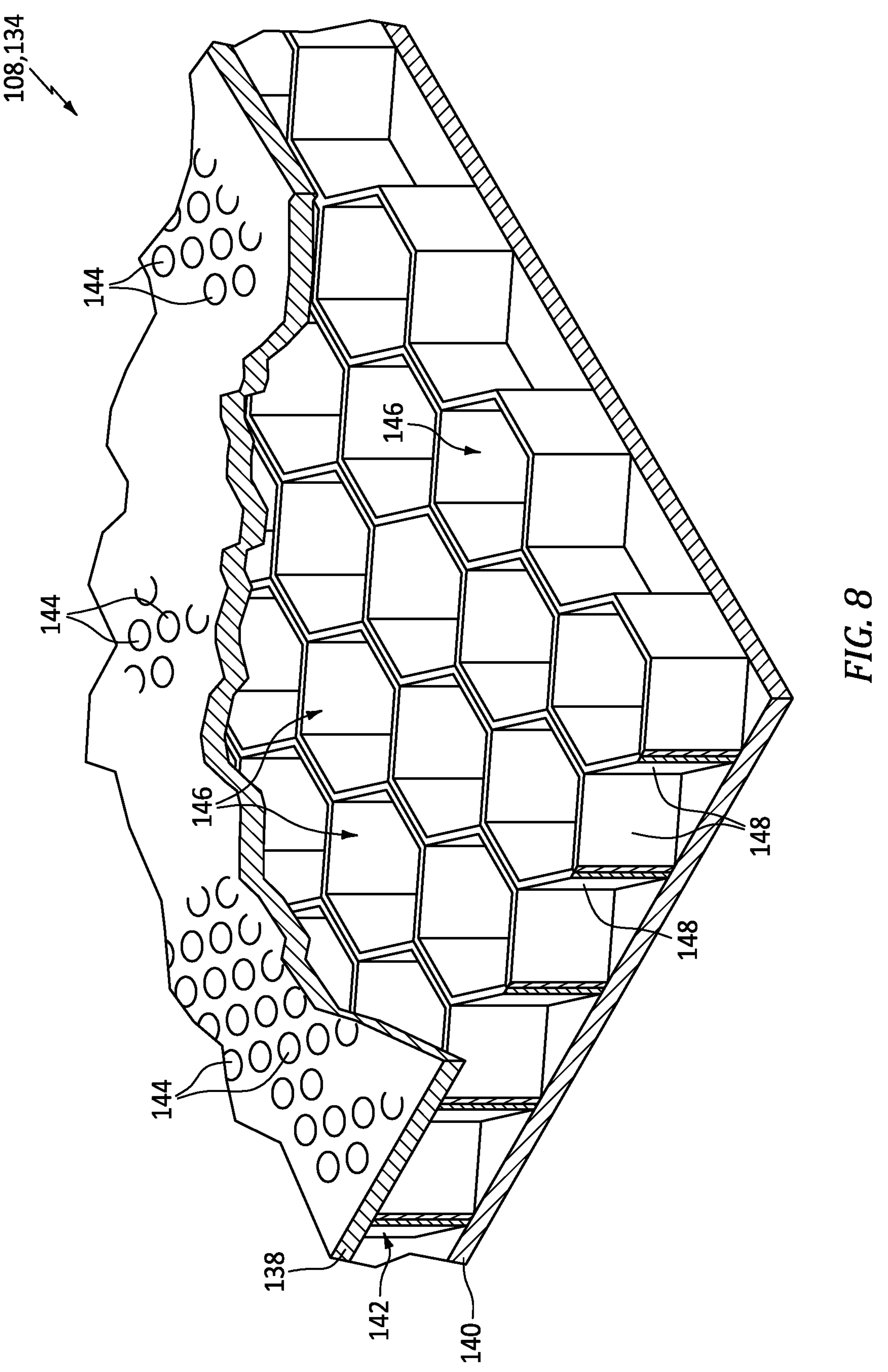
FIG. 8 is a partial cutaway illustration of the acoustic panel.

The core 142 is disposed radially between the interior skin 138 and the exterior skin 140. The core 142 of FIG. 7, for example, extends radially (relative to the centerline 36) from the interior skin 138 to the exterior skin 140. The core 142 may also be connected to (e.g., formed integral with or otherwise attached to) the interior skin 138 and/or the exterior skin 140. The core 142 of FIG. 7 forms a plurality of internal cavities 146 within the acoustic panel 134. Each of these cavities 146 extends (e.g., radially) through the core 142 from the interior skin 138 to the exterior skin 140. Each of the cavities 146 extends within the core 142 between opposing sidewalls 148 for that respective cavity 146. Referring to FIG. 8, each cavity 146 may have a polygonal (e.g., a hexagonal, rectangular, etc.) cross-sectional geometry when viewed in a plane parallel with the interior skin 138 and/or the exterior skin 140. The core 142 of FIG. 8, for example, is configured as a honeycomb core. However, various other cellular core configurations are known in the art and are contemplated by the present disclosure. Referring again to FIG. 7, each of the cavities 146 may be fluidly coupled to the air flowpath 84 through one or more respective perforations 144 in the interior skin 138. Each of the cavities 146 of FIG. 7, by contrast, is fluidly decoupled (e.g., divided, separated, etc.) from the external environment 118 by the exterior skin 140. With the arrangement of FIG. 7, each cavity 146 and its associated perforation(s) 144 may operate as a Helmholtz type resonator that attenuates noise propagating within the downstream section 104 of the air flowpath 84; e.g., the interior volume 106.

In some embodiments, the acoustic panel 134 may be mounted to the boom sidewall 108 within the tail boom 30. In other embodiments, referring to FIG. 7, the acoustic panel 134 may be configured as an integral part of the boom sidewall 108. The boom sidewall 108 of FIG. 7, for example, may include the acoustic panel 134, where the interior skin 138 forms the sidewall inner side 112 and the exterior skin 140 forms the sidewall outer side 114/the exterior surface 116. In another example, the boom sidewall 108 may include the exterior skin 140, where the core 142 is abutted against the sidewall inner side 112. Moreover, while the tail boom 30 and its boom sidewall 108 are described above with a single acoustic panel 134, it is contemplated the acoustic panel of FIGS. 3 and 4 may be divided into a plurality of (e.g., circumferentially extending and/or longitudinally extending) segments, where each segment is a separate acoustic panel 134.

Figures 9A, 9B:
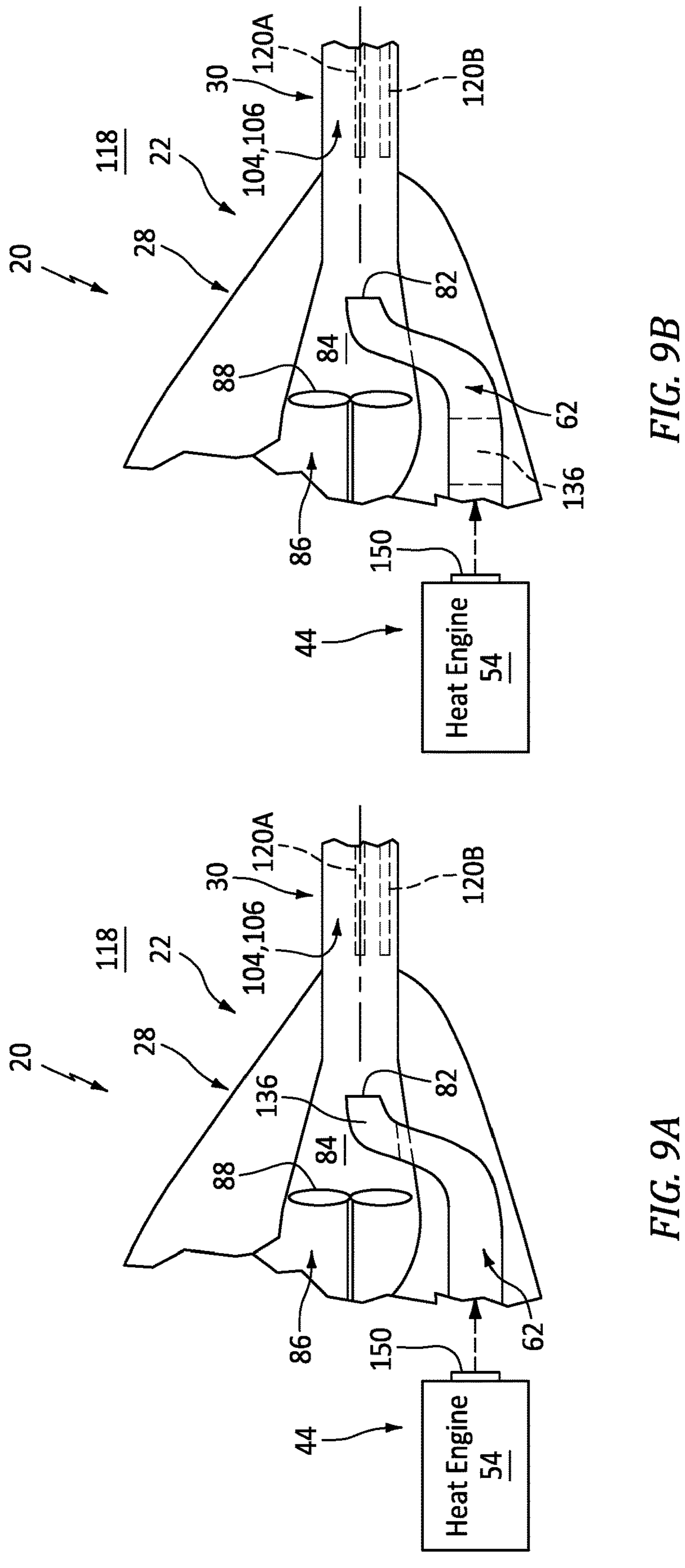
FIGS. 9A and 9B are partial schematic illustrations of the rotorcraft of FIG. 1 with a muffler at various locations.

Referring to FIGS. 9A and 9B, the muffler 136 is fluidly coupled inline along the powerplant flowpath 62 between an exhaust outlet 150 from the heat engine 54 and the flowpath outlet 82 from the powerplant flowpath 62. The muffler 136 of FIG. 9A, for example, is disposed at and may form or be next to the flowpath outlet 82 from the powerplant flowpath 62. The muffler 136 of FIG. 9B is spaced upstream from the flowpath outlet 82 along the powerplant flowpath 62. With such arrangements, the muffler 136 may partially attenuate the noise prior to entering the air flowpath 84. In some embodiments, the muffler 136 and the acoustic panel 134 (see FIGS. 7 and 8) may be configured to attenuate a common (the same) frequency or frequency range of sound. In other embodiments, the muffler 136 and the acoustic panel 134 (see FIGS. 7 and 8) may be configured to attenuate different frequencies or frequency ranges of sound to provide a broader spectrum of sound attenuation.

While the rotorcraft 20 is described above with both the acoustic panel 134 (see FIGS. 7 and 8) and the muffler 136 (see FIGS. 9A and 9B) for sound attenuation, the present disclosure is not limited to such a multi-sound attenuation device arrangement. The rotorcraft 20, for example, may be configured with the acoustic panel 134 and without the muffler 136. In another example, the rotorcraft 20 may be configured with the muffler 136 and without the acoustic panel 134. Moreover, one or more additional sound attenuation devices may also or alternatively be utilized for attenuating the noise generated by the rotorcraft powerplant 44 and its heat engine 54.

Figures 10, 11:
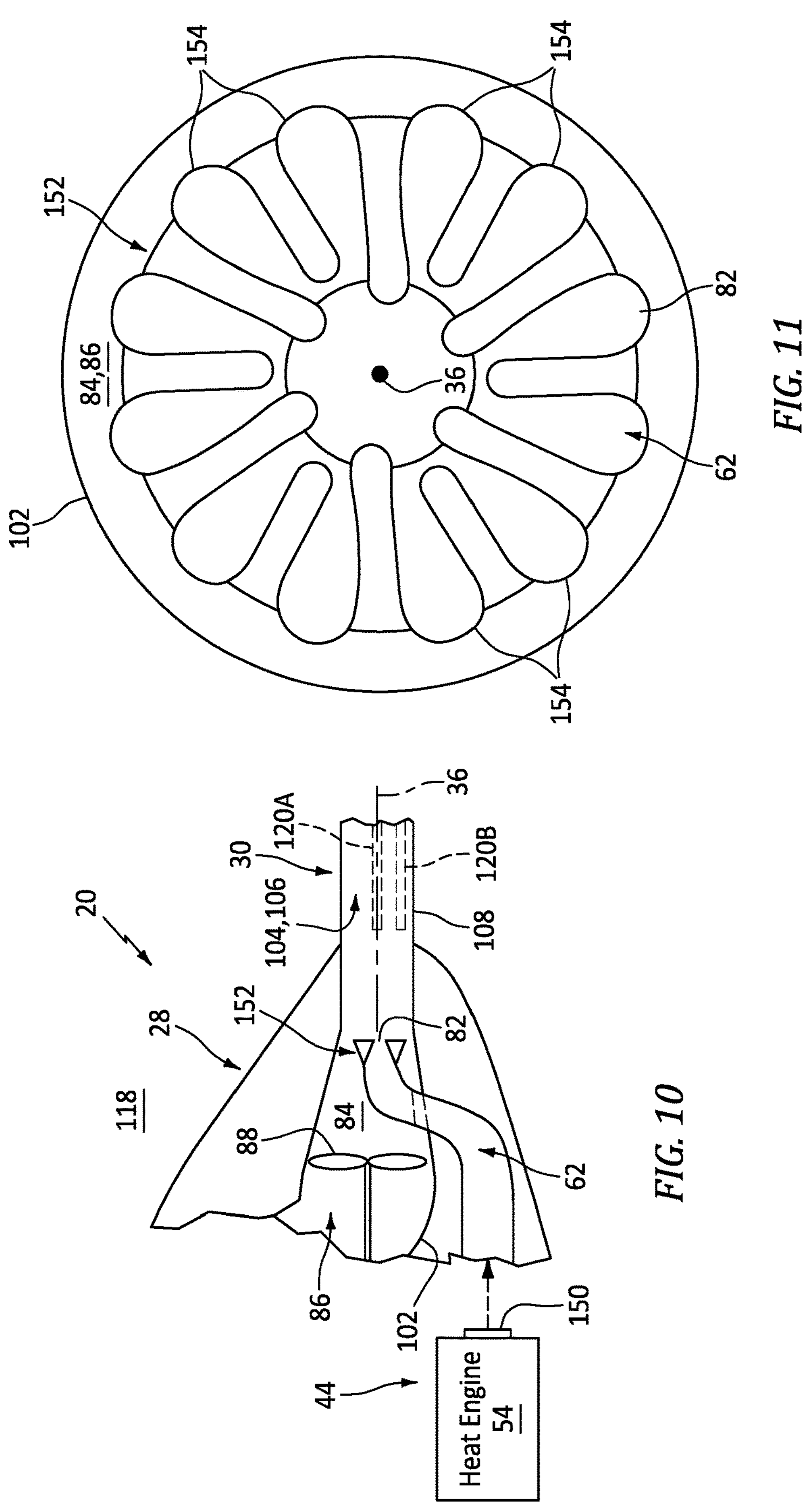
FIG. 10 is a partial schematic illustration of the rotorcraft of FIG. 1 with a mixer.
FIG. 11 is an end view illustration of the mixer within an air duct.

In some embodiments, referring to FIG. 10, a gas flow mixer 152 (e.g., a lobed mixer) may be included to promote mixing between the system air and the combustion products within the air flowpath 84. Such mixing may reduce or eliminate formation of thermal hotspots along a sidewall of the air duct 102 and/or the boom sidewall 108 from the relatively hot combustion products introduced into the air flowpath 84.

The mixer 152 may be arranged at the flowpath outlet 82 from the powerplant flowpath 62. Referring to FIG. 11, the mixer 152 may include a plurality of mixing lobes 154 arranged circumferentially about the centerline 36. An inner side of the mixer 152 and its mixing lobes 154 form a radial outer peripheral boundary of the flowpath outlet 82 from the powerplant flowpath 62. An outer side of the mixer 152 and its mixing lobe form a radial inner peripheral boundary of the air flowpath 84 at a location where the powerplant flowpath 62 projects into the air flowpath 84. The present disclosure, however, is not limited to such an exemplary mixer configuration nor arrangement along the air flowpath 84.

Figures 12A, 12B, 12C:
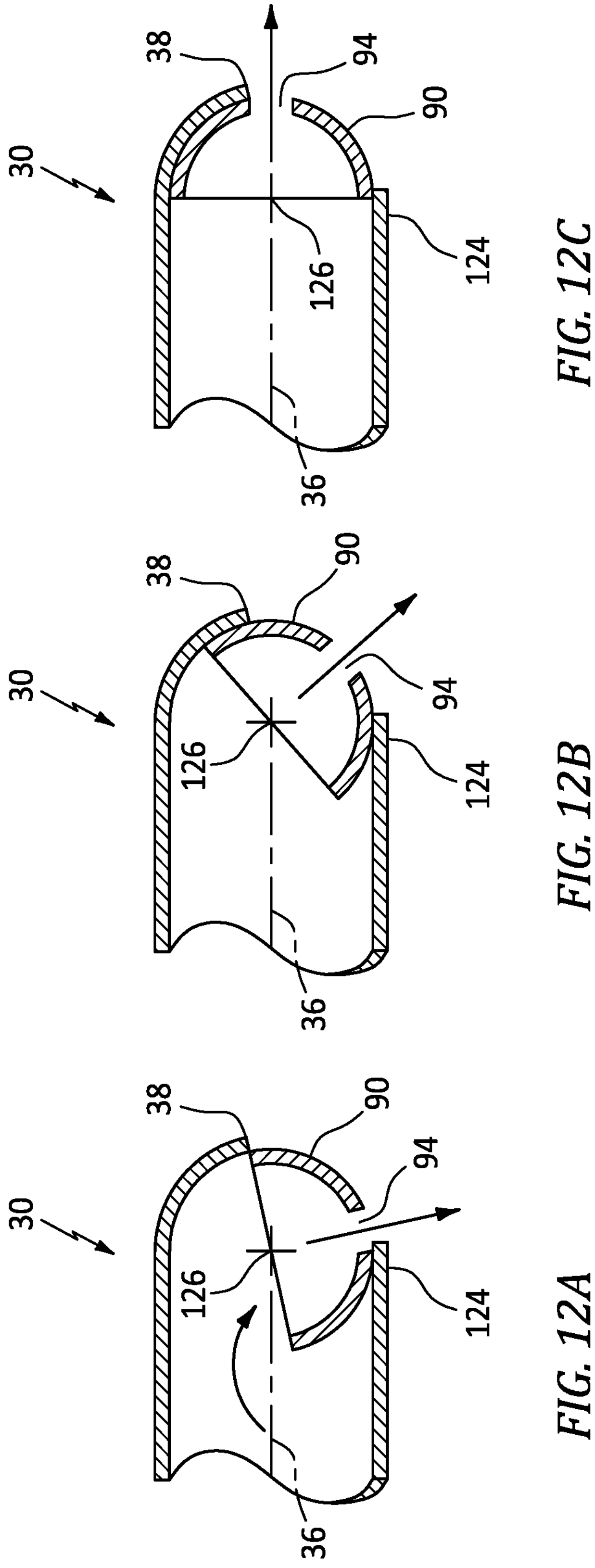
FIGS. 12A-C are schematic sectional illustrations of another variable tail thruster in various thrust positions.

In some embodiments, referring to FIGS. 5A-D, the thruster axis 126 may be a horizontal axis. The thruster axis of FIGS. 5A-D, for example, may be parallel with (e.g., coaxial with) the centerline 36. In other embodiments, referring to FIGS. 12A-C, the thruster axis 126 may be a vertical axis; e.g., relative to gravity. The thruster axis of FIGS. 12A-C, for example, may be angularly offset from (e.g., perpendicular to) the centerline 36. In the thrust position of FIG. 12A, the variable tail thruster 90 positions the exhaust outlet 94 to the second lateral side 124 of the tail boom 30. Here, the variable tail thruster 90 provides lateral thrust. In the thrust position of FIG. 12C, the variable tail thruster 90 positions the exhaust outlet 94 to the boom tail end 38. Here, the variable tail thruster 90 provides longitudinal thrust; e.g., thrust in an aft direction. In the thrust position of FIG. 12B, the variable tail thruster 90 positions the exhaust outlet 94 in an intermediate position to provide some lateral thrust and some longitudinal thrust. The present disclosure, however, is not limited to the foregoing exemplary variable tail thruster configurations.

The rotorcraft powerplant 44 is described above as a turbo-compounded engine system with an intermittent combustion internal combustion engine. The rotorcraft powerplant 44 of the present disclosure, however, is not limited to such an exemplary configuration. It is contemplated, for example, the rotorcraft powerplant 44 may alternatively be configured as a continuous combustion internal combustion engine such as a gas turbine engine or the like. Moreover, while the rotorcraft powerplant 44 is described above as driving rotation of the rotorcraft rotor 42, it is contemplated the rotorcraft powerplant 44 and its heat engine 54 may also or alternatively power operation of another apparatus such as an electric generator.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a rotorcraft, comprising:

a fuselage;

a tail boom connected to and projecting longitudinally out from the fuselage, the tail boom comprising an acoustic panel and a tubular sidewall; and a rotorcraft lift system including a rotorcraft rotor and a powerplant configured to drive rotation of the rotorcraft rotor to generate rotorcraft lift, the powerplant including a heat engine and a powerplant flowpath, the powerplant flowpath extending through the heat engine, the heat engine comprising a rotary engine, and an outlet from the powerplant flowpath fluidly coupled to an interior volume in the tail boom;

wherein the tubular sidewall forms an exterior of the tail boom and an outer peripheral boundary of the interior volume within the tail boom; and wherein the acoustic panel is an integral part of the tubular sidewall and extends longitudinally along the interior volume downstream of the outlet from the powerplant flowpath.

2. The assembly of claim 1, wherein the acoustic panel includes a first skin, a second skin and a cellular core between and connected to the first skin and the second skin;

the cellular core forms a plurality of cavities within the acoustic panel between the first skin and the second skin, and each of the plurality of cavities is fluidly coupled with the interior volume through one or more respective perforations in the first skin.

3. The assembly of claim 2, wherein the first skin forms an outer peripheral boundary of the interior volume.

4. The assembly of claim 2, wherein the second skin forms an exterior surface of the tail boom.

5. The assembly of claim 2, wherein the cellular core comprises a honeycomb core.

6. The assembly of claim 1, wherein the interior volume extends longitudinally along a centerline in the tail boom; and the acoustic panel extends circumferentially about the centerline.

7. The assembly of claim 1, further comprising a muffler fluidly coupled inline along the powerplant flowpath between the heat engine and the outlet from the powerplant flowpath.

8. The assembly of claim 1, further comprising:

an air system comprising an air flowpath;

an upstream section of the air flowpath extending within the fuselage; and a downstream section of the air flowpath extending longitudinally within the tail boom, the downstream section of the air flowpath comprising the interior volume.

9. The assembly of claim 8, further comprising a mixer arranged at the outlet from the powerplant flowpath.

10. The assembly of claim 8, wherein the air system is configured as an anti-torque system for the rotorcraft.

11. The assembly of claim 8, wherein the tail boom further includes a slot extending longitudinally in the sidewall, the slot projecting through the sidewall to fluidly couple the downstream section of the air flowpath to an environment external to the tail boom.

12. The assembly of claim 8, wherein the tail boom projects longitudinally along a centerline out from the fuselage to a distal tail end of the tail boom; and the downstream section of the air flowpath extends longitudinally within the tail boom to an outlet located at the distal tail end of the tail boom.

13. The assembly of claim 12, wherein the tail boom includes a variable tail thruster arranged at the distal tail end of the tail boom; and the variable tail thruster comprises the outlet and is rotatable about an axis.

14. The assembly of claim 8, wherein the powerplant further includes a heat exchanger arranged in the air flowpath upstream of the outlet from the powerplant flowpath; and the powerplant flowpath further extends through the heat exchanger upstream of the heat engine.

15. An assembly for a rotorcraft, comprising:

a rotorcraft airframe including a fuselage and a tail boom, the tail boom projecting longitudinally along a centerline out from the fuselage to a distal end of the tail boom, and the tail boom comprising an acoustic panel longitudinally lining at least a portion of an interior volume within the tail boom;

a heat engine disposed in the rotorcraft fuselage, an exhaust outlet from the heat engine fluidly coupled with an environment external to the rotorcraft airframe through the interior volume within the tail boom, wherein the acoustic panel is configured to attenuate noise propagating in combustion products output from the heat engine through the exhaust outlet;

an air system comprising an air flowpath, an upstream section of the air flowpath extending within the fuselage, and a downstream section of the air flowpath extending longitudinally within the tail boom, the downstream section of the air flowpath comprising the interior volume;

a sidewall extending longitudinally along a centerline and circumferentially around the downstream section of the air flowpath; and a plurality of slots extending longitudinally in the sidewall as an array, each of the plurality of slots projecting through the sidewall to fluidly couple the downstream section of the air flowpath to an environment external to the tail boom;

wherein the heat engine comprises an intermittent combustion internal combustion engine.

16. The assembly of claim 15, further comprising a muffler fluidly coupled inline between the exhaust outlet from the heat engine and the interior volume.

17. An assembly for a rotorcraft, comprising:

a fuselage;

a tail boom connected to and projecting longitudinally out from the fuselage, the tail boom comprising a tubular sidewall and an acoustic panel, the tubular sidewall forms an exterior of the tail boom and an outer peripheral boundary of the interior volume within the tail boom, and the tail boom projecting longitudinally along a centerline out from the fuselage to a distal tail end of the tail boom; and a rotorcraft lift system including a rotorcraft rotor and a powerplant configured to drive rotation of the rotorcraft rotor to generate rotorcraft lift, the powerplant including a heat engine and a powerplant flowpath, the powerplant flowpath extending through the heat engine, and an outlet from the powerplant flowpath fluidly coupled to an interior volume in the tail boom;

wherein the acoustic panel extends longitudinally along the tail boom to the distal tail end of the tail boom, and the acoustic panel extends longitudinally along the interior volume downstream of the outlet from the powerplant flowpath; and wherein the acoustic panel includes a first skin, a second skin and a cellular core between and connected to the first skin and the second skin, the cellular core forms a plurality of cavities within the acoustic panel between the first skin and the second skin, and each of the plurality of cavities is fluidly coupled with the interior volume through one or more respective perforations in the first skin.

18. The assembly of claim 17, wherein the acoustic panel is an integral part of the tubular sidewall.

* * * * *